UNITED STATES PATENT OFFICE.

LOWELL H. MILLIGAN, OF NEW KENSINGTON, PENNSYLVANIA, ASSIGNOR TO NEWTON D. BAKER, SECRETARY OF WAR.

PROCESS OF MAKING ARSENIC TRICHLORIDE.

1,421,978.   Specification of Letters Patent.   Patented July 4, 1922.

No Drawing.   Application filed June 12, 1920. Serial No. 388,663.

(FILED UNDER THE ACT OF MARCH 3, 1883, 22 STAT. L., 625.)

*To all whom it may concern:*

Be it known that I, LOWELL H. MILLIGAN, a citizen of the United States, residing in New Kensington, Pennsylvania, have invented Improvements in Processes of Making Arsenic Trichloride, of which the following is a specification.

The invention herein described may be used by the Government, or any of its officers or employees, in prosecution of work for the Government, or any other person in the United States, without payment of any royalty thereon.

This invention relates to a process for the preparation of arsenic trichloride from arsenic containing materials and phosgene or carbon monoxide and chlorine or substances containing these materials.

One of the objects of this invention is to treat certain arsenic compounds with either a mixture of carbon monoxide and chlorine or with phosgene, with or without the presence of a catalyzer.

A further object of this invention is to convert by-product gases, such as "tail gas" which is ordinarily a waste by-product in the manufacture of phosgene, and contains phosgene diluted with impurities, such as nitrogen, carbon monoxide, chlorine, hydrochloric acid, water vapor, etc., into valuable commercial products. It is to be understood that the term phosgene as used hereafter refers both to phosgene and to mixtures of other materials or gases containing phosgene.

When phosgene or a mixture of carbon monoxide and chlorine is treated with an arsenic compound such as the trioxide or sulphide, the following reactions take place:

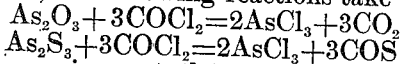

In carrying out the process the arsenic compound which should generally be finely ground, may be placed in or continuously fed into a suitably heated tube or furnace and the phosgene or mixture of carbon monoxide and chlorine conveyed through. The reaction takes place more rapidly at lower temperatures in the presence of carbon. The carbon acts either as a catalyzer, or else tends to reduce the arsenic compound to metallic arsenic, which then reacts with the phosgene or carbon monoxide and chlorine more readily. In this process the term catalyzer is intended to include carbon or other material which acts similarly to carbon, whether its action be wholly catalytic or not, provided there is some catalysis. If carbon or other catalyzer is employed, the process may be made continuous by feeding in a mixture of the arsenic compound and the catalyzer at one point in the furnace and removing the catalyzer at another point. This catalyzer may then be mixed with a fresh portion of the arsenic compound and fed through the apparatus again. A continuous process may be also carried out in a furnace in which the raw material is continuously fed and mixed with the catalyzer in the reaction chamber. When the arsenic compound used is volatile, it may be volatilized into the reaction chamber.

When the arsenic material used is arsenic trioxide, and carbon is employed, temperatures upward of 175° C., e. g., in the neighborhood of 200° C. have been found desirable. Thus, when a mixture of 80 parts by weight of powdered white arsenic and 20 parts by weight of a form of carbon known commercially as filt-char, are mixed together, gradually heated up in a suitable furnace and carbon monoxide and chlorine, or phosgene, or mixtures of these gases with impurities, conveyed through, the arsenic trichloride which is formed is distilled out of the furnace and may be condensed in a suitable apparatus.

At about 250° C., the reaction proceeds rapidly and the yield of arsenic trichloride is high. If the raw materials are pure and practically dry, the arsenic trichloride is water white and pure except for dissolved phosgene or other gases which can be removed by distillation or otherwise. When the reaction conditions are not so favorable, some water may be condensed with the arsenic trichloride, but since the two liquids are practically immiscible, they can be separated by ordinary methods although some arsenic will be lost in the water layer.

The process described above may be used in treating "tail gas" for the purpose of converting same into valuable commercial products. The "tail gas", which is a by-product gas in the manufacture of phosgene, is toxic if liberated in the air in quantity, and since it is generally run to waste, special means must be provided in order to render it innocuous, such as scrubbing with caustic soda and then venting through a suitable stack. Any such method of disposal is expensive, requiring towers and uses up chemicals without producing any valuable products. I propose to utilize this "tail gas" containing phosgene by allowing it to react with heated substances either with or without a catalyzer in such a way that chlorides, oxychlorides or similar compounds, are produced and can be recovered, the greater part of the phosgene being thus removed from the "tail gas" which is therefore rendered much less toxic. "By-product" gaseous mixtures containing carbon monoxide and chlorine, which are also quite toxic, can be utilized to advantage by this process, in a similar way. This process consists in treating these gases with arsenic compounds, in a manner similar to that described for the preparation of arsenic trichloride. If desired, other substances, such as natural minerals, silicates, phosphates, oxides, sulphides, etc., may be substituted for the arsenic compounds, and the products of these reactions are the corresponding chlorides. Carbon facilitates many of these reactions and in its presence it is often possible to work at lower temperatures than could otherwise be done.

The present invention is not limited to the specific examples which should be construed as illustrative and not by way of limitation, and in view of the numerous modifications which may be effected therein without departing from the spirit and scope of this invention, it is desired that only such limitations be imposed as are indicated in the appended claims.

I claim:

1. In a process of making arsenic trichloride, heating an arsenic compound with phosgene in the presence of a substance which lowers the reaction temperature.

2. In a process of making arsenic trichloride, heating an arsenic compound with phosgene in the presence of carbon.

3. In a process of making arsenic trichloride, heating an arsenic compound with phosgene at temperatures of 175-250° C.

4. In a process of making arsenic trichloride, heating an arsenic compound with phosgene at temperatures of 175-250° C. in the presence of a substance which facilitates the reaction at these temperatures.

5. In a process of making arsenic trichloride, heating an arsenic compound with phosgene in the presence of carbon at temperatures of 175-250° C.

6. In a process of making arsenic trichloride, heating an arsenic compound with material containing chlorine and the CO radical in the presence of a substance which lowers the reaction temperature.

7. In a process of making arsenic trichloride, heating an arsenic compound with material containing chlorine and the CO radical in the presence of carbon.

8. In a process of making arsenic trichloride, heating an arsenic compound with material containing chlorine and the CO radical in the presence of carbon at temperatures of 175-250° C.

9. In a process of making arsenic trichloride, heating an arsenic compound with "tail gas".

10. In a process of making arsenic trichloride, heating an arsenic compound with "tail gas" in the presence of a substance which lowers the reaction temperature.

11. In a process of making arsenic trichloride, heating an arsenic compound with "tail gas" in the presence of carbon.

12. In a process for making arsenic trichloride, heating an arsenic compound with chlorine and a reducing agent.

13. In a process for making arsenic trichloride, heating an arsenic compound with chlorine and carbon.

LOWELL H. MILLIGAN.